2 Sheets—Sheet 1.

J. S. KEMP.

Manure-Spreader.

No. 8,254. Reissued May 28, 1878.

Witnesses:

P. Dieterich

Frank H. Duffy

Inventor:

Joseph S. Kemp

Per C. H. Watson & Co Attorneys.

2 Sheets—Sheet 2.

J. S. KEMP.

Manure-Spreader.

No. 8,254. Reissued May 28, 1878.

Witnesses:

P. Dieterich

Frank H. Duffy

Per C. H. Watson & Co Attorneys.

Inventor:

Joseph S. Kemp

UNITED STATES PATENT OFFICE.

JOSEPH S. KEMP, OF MAGOG, CANADA.

IMPROVEMENT IN MANURE-SPREADERS.

Specification forming part of Letters Patent No. 190,220, dated May 1, 1877; Reissue No. 8,254, dated May 28, 1878; application filed March 23, 1878.

*To all whom it may concern:*

Be it known that I, JOSEPH SARGENT KEMP, of Magog, in the county of Stanstead, Canada, have invented certain new and useful Improvements in Manure-Spreaders; and I do hereby declare that the following is a full, clear, and exact description of my invention, that will enable others skilled in the art to which it appertains to make and use the same, reference being had to the accompanying drawings, and to the letters of reference marked thereon, which form a part of this specification.

Figure 1:
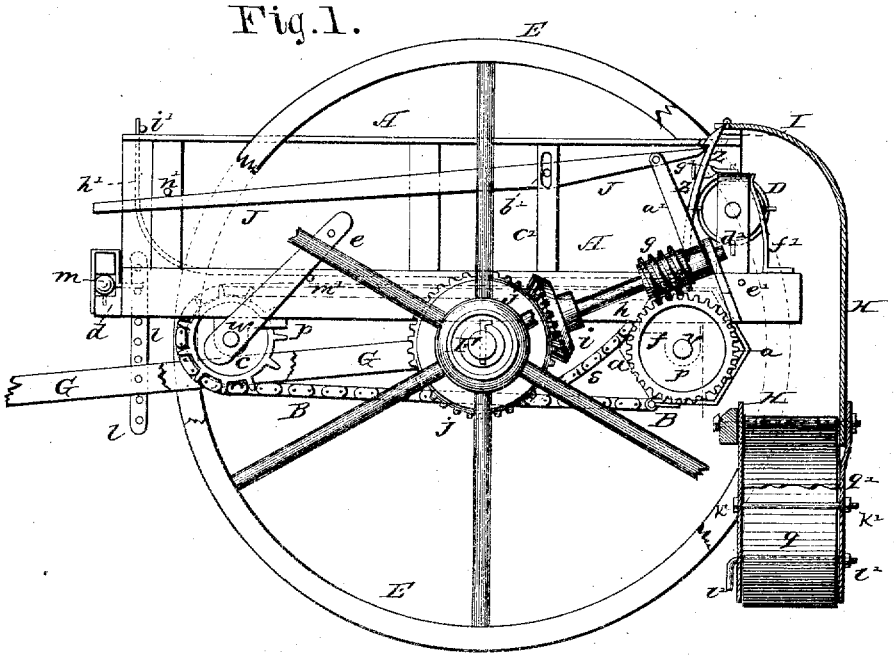
Figure 2:
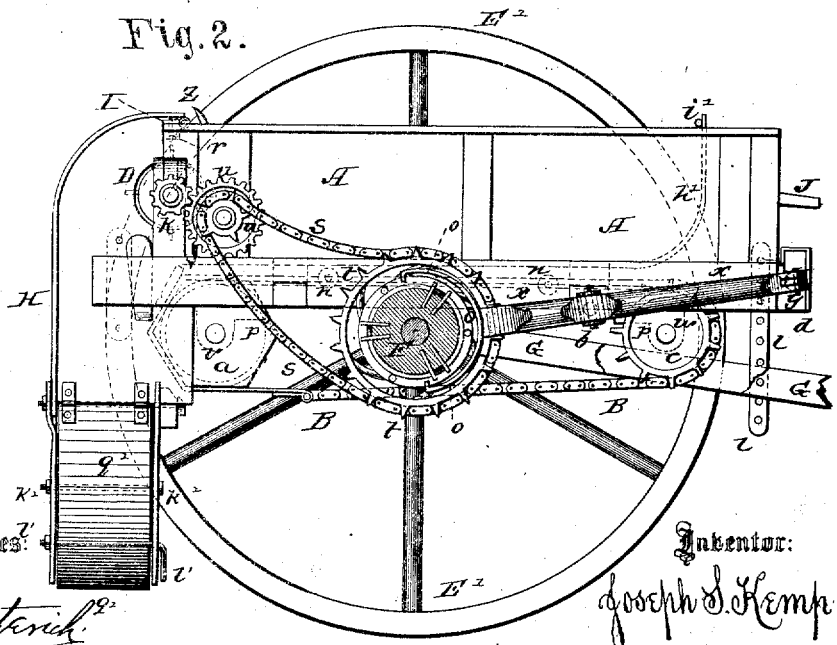
Figures 3, 4:
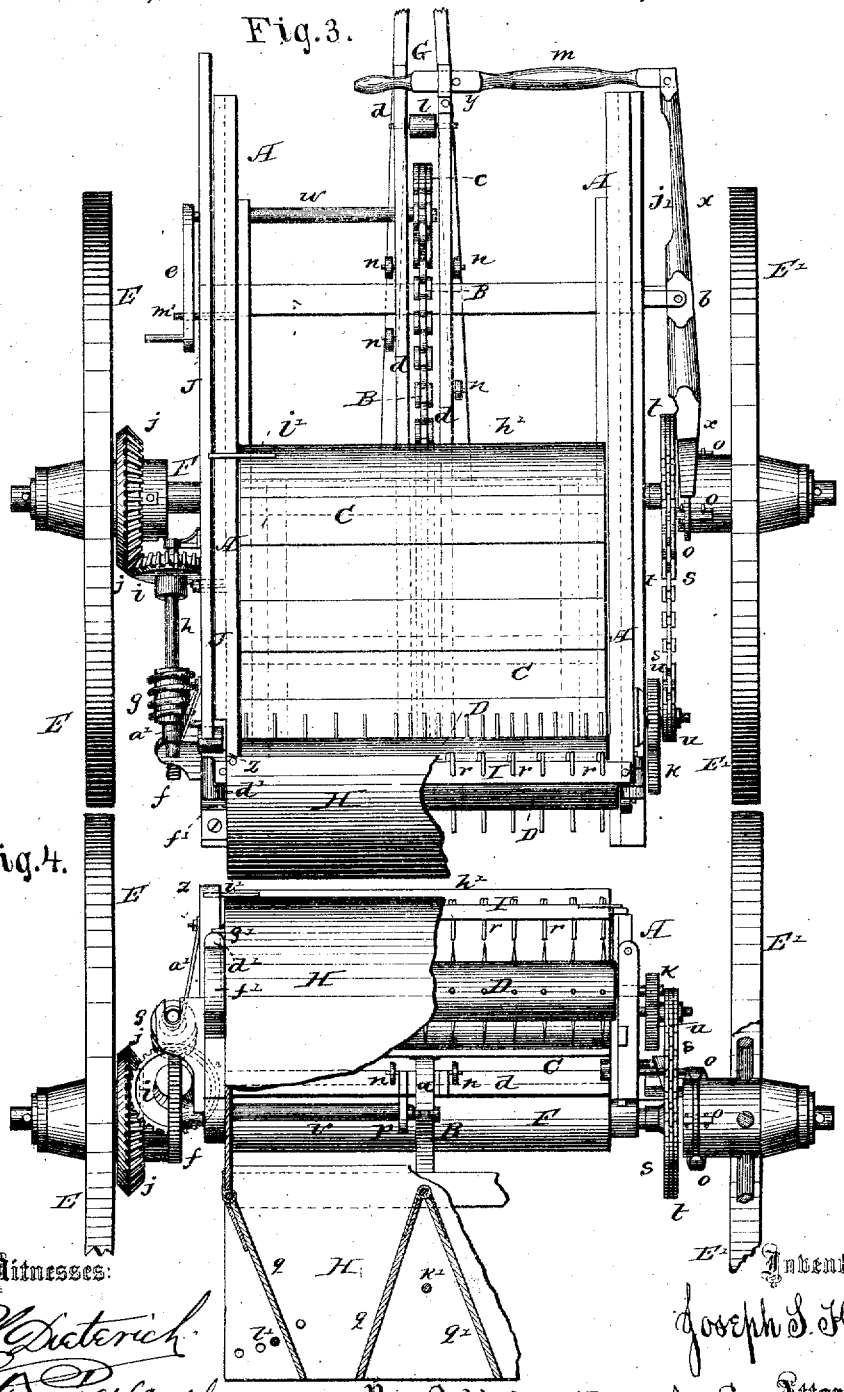

Figure 1 represents a side elevation, showing the left-hand side of a machine embodying my invention. Fig. 2 is a side elevation of the same, showing the right-hand side, a portion of one wheel being represented as removed. Fig. 3 is a plan view of the same, showing the floor partly run out, in order to more fully show the mechanism below. Fig. 4 is a rear-end view of the same, portions of the drill attachment being represented as broken away to show the arrangement of the machinery beyond.

The object of this invention is to provide a farm wagon or cart with a movable floor composed of slats secured to an endless belt or chain. To the foremost slat an end board is secured, which, when the machine is in forward motion, moves, by suitable gearing, slowly to the rear, thus propelling the material that may be loaded in the vehicle against a rotating toothed drum, which pulverizes and evenly spreads the load on the ground behind. The labor of unloading manure or other material is thus avoided, and the process carried out much more rapidly and perfectly.

A in the drawing represents the box or body of the machine, within which the load is placed. B is the endless belt or chain, about one-half of which is made horizontally flat, with links corresponding in length to the width of the slats that comprise the floor C, to which they are contiguously secured. The endless belt or chain incloses the two pulleys which stretch and guide it, one, *a*, at the rear of the machine, the other, *c*, near the forward part, as is clearly shown in Figs. 1 and 2.

The pulley *a* is hexagonal in form, although it may be octagonal, if desired. This pulley is provided with small projections in each of its faces, which fit into corresponding cavities or holes in the belt or chain B, and is mounted on a shaft, *v*, which extends to the left to the outside of the body A, where it carries a gear-wheel, *f*, the teeth of which engage with the spiral thread of a worm-gear, *g*, mounted on a shaft, *h*.

The bevel-gear wheel *i* is also mounted on the shaft *h*, which has its forward bearing upon or near the axle F. This wheel *i* engages with a larger bevel-gear wheel, *j*, secured to and revolving with the hub of the wheel E. Thus it will be seen the floor C derives motion, when in gear, from the wheel E.

The pulley *c* is made to fit the links of the belt or chain B, and is mounted on a shaft, *w*, which extends to the left a little beyond the frame-work of the body A, where it carries a crank, *e*, the use of which will hereinafter be explained.

G is the tongue or pole, (represented as broken off,) which is made forked to permit the passage of the belt or chain B. It also carries a brace, *l*, perforated with holes in the ordinary manner, for the purpose of adjusting the inclination of the body A.

The two middle timbers *d d* of the frame of the machine carry small pulleys *n n*, which support the floor C, and enable it to move easily.

D is the toothed drum or beater, a portion of the teeth of which are made knife-edged, for the purpose of more effectually cutting and pulverizing turf, roots, or strawy manure.

The comb I is furnished with spring-teeth *r*, which prevent the passage of large lumps, which, being held against the toothed drum D by the said comb, become thoroughly pulverized.

Upon one end of the axle of the toothed drum a pinion, *k*, is secured, the teeth of which mesh into teeth of a larger gear-wheel, *u*. The hub of this wheel is inclosed by and made to fit the links of a chain, *s*. This chain also incloses a larger chain-wheel, *t*, the hub of which revolves upon and encircles a portion of the axle F.

When it is desired to put the machinery of this side in motion, the chain-wheel *t* is made to revolve with the wheel E′ by means of a clutch, *o*, upon the hub of said wheel. This clutch is operated by a forked lever, *x*, pivoted at *b*, and jointed to a handle, *m*, at the forward part of the machine, as clearly shown in Fig. 3.

The handle extends to the left, so as to be within easy reach of the operator, and is provided with a catch, *y*, which locks the clutch *o* in or out of engagement with the spokes of the wheel *t*, as desired. In order to insure this engagement, the lever *x* is made thin at *j'*, Fig. 3, so as to permit it to spring should the points of the clutch rest on the spokes of the said wheel when the pin *y* is locked in position for motion.

The lower end of the bar *a'* is journaled to the shaft *h*, as shown in Fig. 1, and at its upper extremity is pivoted to the lever J, which is also pivoted to a standard, *c'*, of the body A in such a manner that it has a little vertical play, and its rear end, when in use, rests beneath the catch of a spring, Z.

One bearing, *d*, of the toothed drum D is pivoted at *e'* in such a manner that when too much pressure is brought to bear on the forward side of the said toothed drum this bearing will be forced back, flexing the spring *f'*, and at the same time, by means of the coupling *g'*, drawing the spring Z away from contact with the lever J, when the worm-gear *g* will be disengaged from the gear-wheel *f*, thus throwing the machinery of this side out of gear and preventing damage.

To the foremost slat of the floor C is secured the end board *h'*, which has a projection, *i'*, on its upper left-hand corner, the object of which is this: When the load is discharged, the projection strikes the upper extremity of the spring Z, forcing it away from the lever J, thus liberating it, with the result before described. The load having been discharged, the floor C is brought to its original position by revolving the crank *e*, when it can be locked by a pin, *m'*, Fig. 1.

The machine, having been loaded and taken to the place of deposit, is put in gear by two movements, one being by operating the clutch *o* by means of the handle *m*, as before described, and the other by raising the forward end of the lever J until the opposite end is depressed sufficiently to engage with the catch on the spring Z. Should the spiral thread of the worm *g* lodge upon the points of the teeth of the wheel *f*, the pivot in the lever J will rise in the slot in the standard *c'*.

The forward end of the said lever is now bent down below the hole *n'*, when the pin *m'* is withdrawn from before the crank *e* and inserted in the hole *n'*, thus holding the lever J in position. The machine being in motion, the worm *g* revolves until it drops in gear with the wheel *f*, when the floor C will be propelled toward the drum D, which, being also in motion, automatically unloads the machine.

The drill attachment H can be put on the machine when it may be desired to deposit the manure in drills or rolls. The chutes *q* and *q'* are adjustable, so as to admit of the drills being deposited at various distances apart. To effect this adjustment, the bolt *k'* is made to draw the opposing walls of the drill attachment toward each other, thus pressing them upon the edges of the middle chute *q'*, and holding them firmly in the position in which they may be placed. The chutes *q* are held in the desired position by means of rods *l'*, which are inserted in holes for that purpose, as shown in Fig. 4.

The crank *e* can be so operated as to greatly facilitate the loading by returning the floor C a portion of the way to the rear, then loading that portion, after which return to place and finish the load, and by so doing the manure will be more evenly loaded, which is a great help in discharging the manure evenly.

Having thus fully described my invention, what I claim as new, and desire to secure by Letters Patent, is—

1. In a fertilizer-distributer, the toothed drum or beater D, having a portion of its teeth made knife-edged, substantially as and for the purpose set forth.

2. The yielding toothed drum D, in combination with the spring *f*, coupling *g'*, and spring Z, substantially as and for the purpose set forth.

3. The combination of the driving-wheel, provided with bevel-gear *j* on the shaft *h*, with the bevel-gear *i* and worm *g*, the feeding-wheel *f*, endless chain B, and bottom C, substantially as and for the purpose set forth.

4. The spring-lever J, connected to the gearing operating the slotted belt or bottom B C, in combination with the spring Z, coupling *g'*, drum D, pivoted bearing *d'*, and spring *f'*, substantially as and for the purpose set forth.

5. In a fertilizer-distributer, the body A and floor C, in combination with the bevel-wheel *j*, gear *i*, inclined shaft *h*, worm-gear *g*, feed-wheel F, and the polygonal pulley *a*, constructed and arranged substantially as and for the purpose set forth.

In testimony that I claim the foregoing I have hereunto set my hand this 16th day of March, 1878.

JOSEPH SARGENT KEMP.

Witnesses:
JOHN C. GRAY,
WM. S. ROBBINS.